(12) United States Patent
Polasek (10) Patent No.: US 8,414,156 B2
(45) Date of Patent: Apr. 9, 2013

(54) SYSTEM AND METHOD FOR MINIMIZING HYSTERESIS IN A MOTOR DRIVE SYSTEM

(75) Inventor: Jiri Polasek, Postredni Becva (CZ)

(73) Assignee: ROBE Lighting s.r.o., Postredni Becva (CZ)

( * ) Notice: Subject to any disclaimer, the term of this patent is extended or adjusted under 35 U.S.C. 154(b) by 286 days.

(21) Appl. No.: 12/075,362

(22) Filed: Mar. 11, 2008

(65) Prior Publication Data

US 2009/0231864 A1     Sep. 17, 2009

(51) Int. Cl.
*F21V 21/26* (2006.01)
(52) U.S. Cl.
USPC ........... 362/271; 362/287; 362/372; 362/428; 362/524

(58) Field of Classification Search .......... 362/271–275, 362/285–289, 372, 418–430, 524
See application file for complete search history.

(56) References Cited

U.S. PATENT DOCUMENTS

| 4,716,344 A | * | 12/1987 | Newell et al. | 315/312 |
| 7,555,970 B2 | * | 7/2009 | Hawkes et al. | 74/665 A |

* cited by examiner

*Primary Examiner* — Jason Moon Han (57) ABSTRACT

The present invention provides an automated luminaire with more repeatable, identical and accurate movements by normalization for motion drive system hysteresis. The normalization system utilizes the use of multiple drivers which drive the drive system which engage in opposing movements following a movement to normalize the hysteresis in the drive system so that subsequent moves begin from the same drive system conditions.

14 Claims, 8 Drawing Sheets

SYSTEM AND METHOD FOR MINIMIZING HYSTERESIS IN A MOTOR DRIVE SYSTEM

TECHNICAL FIELD OF THE INVENTION

The present invention generally relates to motor drive systems and more specifically to the configuration and control of motors and drive systems to move an output shaft in an automated multiparameter luminaire.

BACKGROUND OF THE INVENTION

Luminaries with automated and remotely controllable functionality are well known in the entertainment and architectural lighting markets. Such products are commonly used in theatres, television studios, concerts, theme parks, night clubs and other venues. A typical product will typically provide control over the pan and tilt functions of the luminaire allowing the operator to control the direction the luminaire is pointing and thus the position of the light beam on the stage or in the studio. Typically this position control is done via control of the luminaire's position in two orthogonal rotational axes usually referred to as pan and tilt. Many products provide control over other parameters such as the intensity, color, focus, beam size, beam shape and beam pattern. The products manufactured by Robe Show Lighting such as the ColorSpot 1200E are typical of the art.

Considering as an example, the use of such a product in a theatre, it is common for an automated luminaire to be situated at some considerable distance from the stage, perhaps 50 feet or more. At such a distance very small positional movements of the luminaire will produce a correspondingly large movement of the light beam where it impinges on the stage. In the example given of a 50 foot throw a displacement of 1 inch on the stage would be caused by a change in angle of either of the pan and tilt axes of the light of only 0.1 degree. If we consider that a positional accuracy of the light on the stage of less than 1 inch is desirable we can see that a very high degree of rotational accuracy is desirable for the pan and tilt systems.

Figure 1:
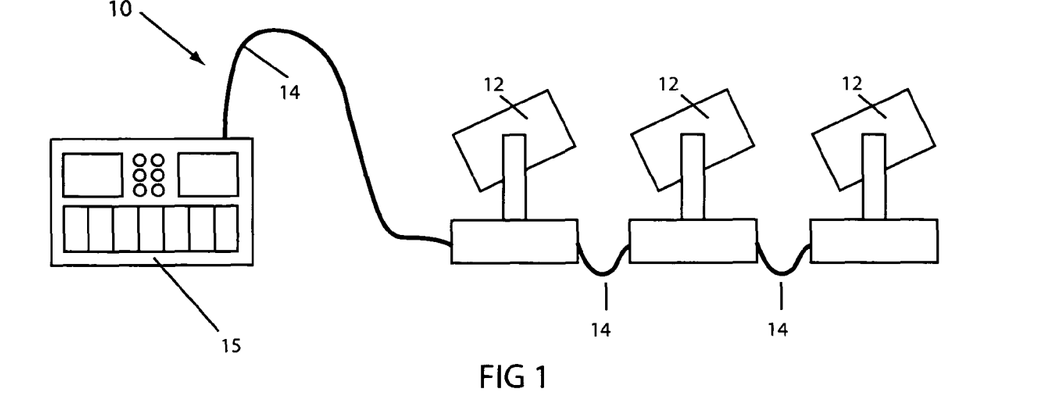
FIG. 1 illustrates a multiparameter automated luminaire lighting system.

FIG. 1 illustrates a typical multiparameter automated luminaire system 10. These systems typically include a plurality of multiparameter automated luminaires 12 which typically each contain on-board a light source (not shown), light modulation devices, electric motors coupled to mechanical drives systems and control electronics (not shown). In addition to being connected to mains power either directly or through a power distribution system (not shown), each luminaire is connected is series or in parallel to data link 14 to one or more control desks 15. The luminaire system 10 is typically controlled by an operator through the control desk 15.

Figure 2:
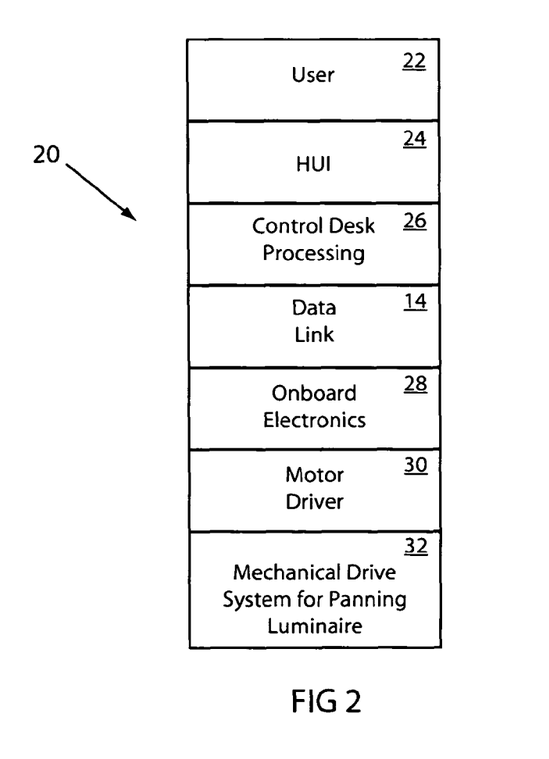
FIG. 2 illustrates an example of the levels of control which may be seen in controlling a parameter of an automated luminaire.

FIG. 2 illustrates different levels of control 20 of a parameter of the light emitted from a luminaire. In this example the levels are illustrated for one parameter: pan (typically movement in a horizontal plane). The first level of control 22 is the user who decides what he wants and inputs information into the control desk through typical computer human user interface(s). The control desk hardware and software then processes the information 26 and sends a control signal to the luminaire via the data link 14. The control signal is received and recognized by the luminaire's on-board electronics 28. The onboard electronics typically includes a motor driver 30 for the pan motor (not shown). The motor driver 30 converts a control signal into electrical signals which drive the movement of the pan motor (not shown). The pan motor is part of the pan mechanical drive 32. When the motor moves it drives the mechanical drive 32 to drive the mechanical components which cause the light beam emanating from the luminaire to pan across the stage.

In some systems it may be possible that the motor driver 30 is in the control desk rather than in the luminaire 12 and the electrical signals which drive the motor are transmitted via an electrical link directly to the luminaire. It is also possible that the motor driver is integrated into the main processing within the luminaire 12. While many communications linkages are possible, most typically, lighting control desks communicate with the luminaire through a serial data link; most commonly using an industry standard RS485 based serial protocol called commonly referred to as DMX-512. Using this protocol of the control desk typically transmitting a 16 bit value for pan and a 16 bit value for tilt parameters to the luminaire. Sixteen (16) bits provides for 65,536 values or steps which provides plenty of controller instruction accuracy for a typical application. If the total motion around and axis is 360 degrees then a 16 bit instructions can provide accuracy of instruction of approximately 0.005 degrees (360°/65,536). With this level of accuracy in the control instructional portion of the control system, the limiting factor in controlling the accuracy of the luminaire's motion predominantly lies with the mechanical systems used to move the pan and tilt axes.

One particular problem inhibiting and limiting the accuracy and repeatability of the movements of an automated luminaire is the mechanical hysteresis or backlash in the mechanical drive system. It is typical in such products to use a single motor or a pair of motors connected to the driven pan and tilt output shafts through either a belt drive or through a direct geared system. In both cases there is inevitably an amount of backlash or slippage or shifting which induces hysteresis in the system. This is particularly noticeable in use when a luminaire returns to a known and pre-recorded position from different directions. A clockwise pan to a stop position will allow the slack in belts or tolerance in gears and mountings to accumulate on one side of the system while an counter-clockwise pan to the same stop position will accumulate that same slack and tolerance on the other side thus giving an effective positional error of approximately two time (2×) the actual slack Additionally there is a need to reduce the transfer of noise and vibration from the motor or motors to the chassis or mounting structure of the automated luminaire. This may be achieved through the use of resilient mounting pads or points as dampeners. Such resilient dampeners are effective at reducing vibration however they introduce a further source of hysteresis due to the inherent flex of the resilient materials.

Various systems have offered solutions to hysteresis. One solution is to provide deliberate dampening or friction to the system to smooth and minimize slack and tolerances. In practice such systems are difficult to control and difficult to manufacture repeatedly and consistently. Additionally any deliberate addition of friction will of necessity increase the power and size of motors needed.

Other solution utilizes highly accurate position sensors on the driven or output shaft of the device rather than, as is more common with servo systems, on the motor or driver shaft. Such systems are expensive to manufacture and may require significant processing power for each motor to ensure that smooth accurate movement occurs without hunting or overshoot.

Other system utilize 'hunting' or 'backstepping' techniques where the system homes in on the final desired position by taking small controlled steps towards it while monitoring the position accurately. Such a system is disclosed in U.S. Pat. No. 5,227,931 to Misumi which covers an anti-hysteresis system by backstepping. This system is slow to operate, requires an accurate sensor on the driven shaft and produces motion in the driven shaft while the final position is sought. It is important in theatrical applications that the driven shaft moves rapidly and accurately to its final position with no visible oscillation or hunting to find its resting point. Any such motion would be noticeable and distracting to the audience.

A yet further solution is to oscillate the output shaft about its final position to equalize any stress, slack or tolerance in the drive system and center the shaft. U.S. Pat. No. 5,764,018 to Liepe et al. uses a 'shaking' system where reducing oscillations center the driven shaft. This methodology has the disadvantage in that it gives significant and noticeable movement in the output not appropriate for the entertainment lighting application.

While the Misumi and Liepe systems may eventually and consistently get to the right position, the process of getting there may be worse than the hysteresis problem they solve in an automated luminaire application.

A still further solution is to use sensors for feedback with a pre-measured correction factor for hysteresis. U.S. Pat. No. 5,374,883 discloses such a system and uses a pre-determined correction for a particular sensor. Such a system is difficult to maintain as any changes in the system due to wear and tear or replacement of parts such as belts will require re-calibration and adjustment of the compensation system.

U.S. Pat. No. 6,580,244 to Tanaka et al discloses using two servo motors driven antagonistically to ensure tension is always in the same direction in the drive chain to avoid backlash. Although this provides good control of backlash when the system is always rotating in one direction to its final position, it doesn't cope as well with a system which has no prior knowledge of that direction and that can be required to travel to the same target position from either direction interchangeably. Accurate servos with sensors or encoders are still required for final positioning.

There is a need for a system which can provide hysteresis and backlash control to ensure accurate positioning of an automated luminaire motion control system without the necessity for accurate position sensors.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGUREs, like numerals being used to refer to like and corresponding parts of the various drawings.

The present invention generally relates to motor control systems and specifically to the use of multiple motors to move a single output shaft in an automated luminaire. The system disclosed provides smooth movement and reduces backlash in the movement to provide a system with high positional accuracy while mitigating the need for expensive high resolution encoders.

In one embodiment the present invention utilizes two motors driving a single output shaft through common or separate drive trains. After the control system detects that the system has come to rest the unit relaxes and equalizes the slack and/or tension in the drive train by first rotating the two motors as an antagonistic pair in opposing directions in one rotation direction, then reversing this turn by rotating the two motors as an antagonistic pair in the opposite direction and finally re-centering the two motors to the desired position. Such a move ensures that all slack and/or tension is centered ready for a further move.

Figure 3:
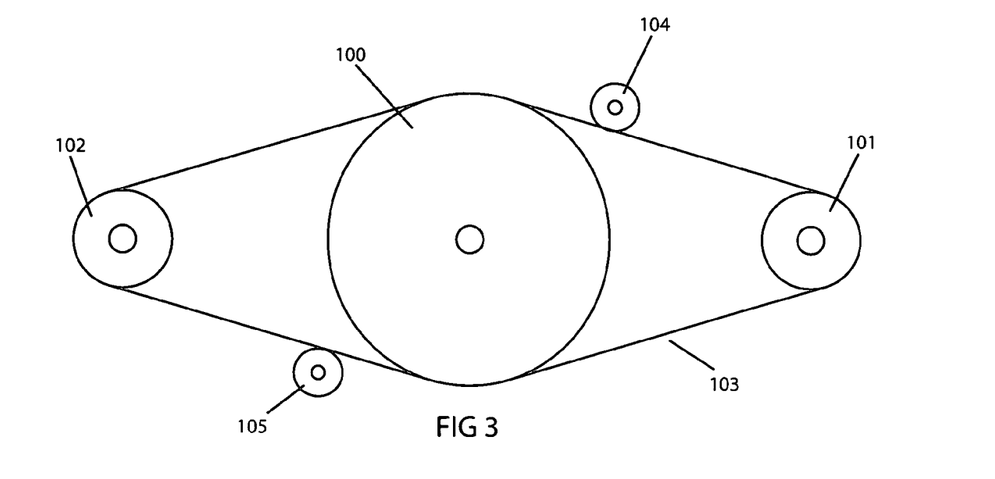
FIG. 3 illustrates an embodiment of the mechanical elements of one embodiment of the present invention.

FIG. 3 illustrates the major mechanical components of a drive system of one embodiment of the present invention. FIG. 3 illustrates the basic components at rest. Driving pinions 101 and 102 and driven-pinion 100 are interconnected via a single endless belt 103. Belt 103 may be a smooth or a toothed belt and pinions 100, 101 and 102 may be friction rollers or gears that mesh with the toothed belt 103. Driving pinions 101 and 102 rotated by their own respective motors (not shown). The type of motor used is not a limitation of this invention and the motors may be selected from a list including but not limited to stepper motors, DC motors, AC motors or other motors known in the art.

In the system illustrated, driving pinions 101 and 102 are smaller than driven pinion 100 thus providing a gear reduction. Such a reduction may be advantageous for reasons of torque and speed of movement however it is not a requirement for the present invention.

The system may also have idler pinions 104 and 105 whose purpose may be to guide the belt 103 and to adjust the tightness of the belt 103. The illustrated embodiment utilizes fixed idler pinions 104 and 105. The system may further have inherent friction or dampening systems to reduce vibration which are not shown in the figures. However it should be appreciated that each of these components will have an effect on the hysteresis in the drive system.

As is well known in the art, most drive systems will normally exhibit an inherent amount of backlash or hysteresis due to belt slackness, dampening and friction, tolerance between belt teeth and pinion teeth and compliance of the belt and pinion mountings. In addition it may be advantageous in such a system to use resilient mountings or dampeners for the motors or pulleys. Such resilient mountings may substantially reduce the transmission of noise and vibration from the motor to the chassis or support which, in turn, will reduce audible noise from the system. A consequence of using resilient dampeners in this manner is that they will introduce further hysteresis into the system as the resilient material flexes under load. The total hysteresis from the multiple sources may manifest itself as a positional error in the output pinion 100.

Figure 4:
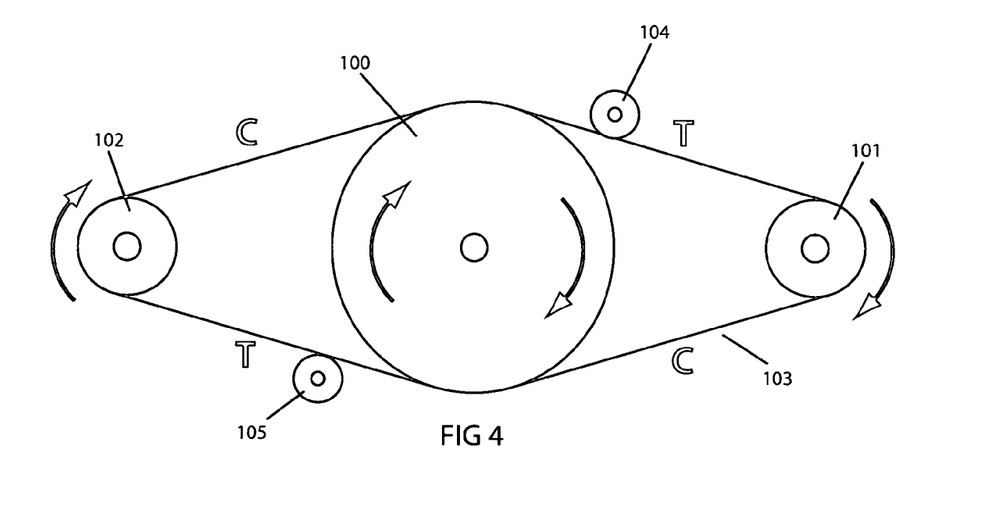
FIG. 4 illustrates basic rotation of the embodiment illustrated in FIG. 3.

Consider a dynamic situation such as the one illustrated in FIG. 4 where driving pinions 101 and 102, under control of their respective motors, are rotating in a clockwise direction. Both motors are being driven at the same speed, direction and with the same applied power. In this mode the belt 103 will have sections where it is under greater tension than the average (indicated as "T" in the figure) and sections where it is under greater compression, or less tension, than the average (indicated as "C/" in the figure). When this system comes to a halt and starts to rotate in the opposite direction, i.e. driven pinions 101 and 102 are rotating counter-clockwise, the first small amount of rotational movement of the pinions 101 and 102 will be absorbed by equalizing this tension in the belt 103 and reversing it such that the sections that were higher in tension (T) become areas higher in compression (C) and vice-versa. Additional rotation movement may be absorbed by the teeth on the belt 103 where it engages with the pinions 101, 102 and 100 adjusting tolerance from one side of each tooth to the other. Friction and dampening systems further add to this hysteresis. The overall result is a 'dead band' as the system reverses direction where movement of the driving pinions 101 and 102 causes no movement of the driven pinion 100. It is important to realize that the size of this dead band is not constant; it is dependant on the speed and torque of the previous movement. This dead band causes a visible error in the position of driven pinion 100 and thus the position of the attached luminaire. This error typically manifests itself as the light beam from the luminaire falling short of its desired position. Prior art drive systems corrected this problem by using high accuracy encoders or position sensors on the driven shaft 100. However, such sensors are expensive and have to be accurately aligned and controlled. The present embodiment makes no use of sensors or encoders to achieve the elimination of this hysteresis and dead band.

The present invention utilizes a movement sequence to equalize any hysteresis in the system such that every move always starts from an identical configuration independent of the speed or torque of the previous move. This ensures that every movement of the system is more repeatable, identical and accurate.

Figure 5:
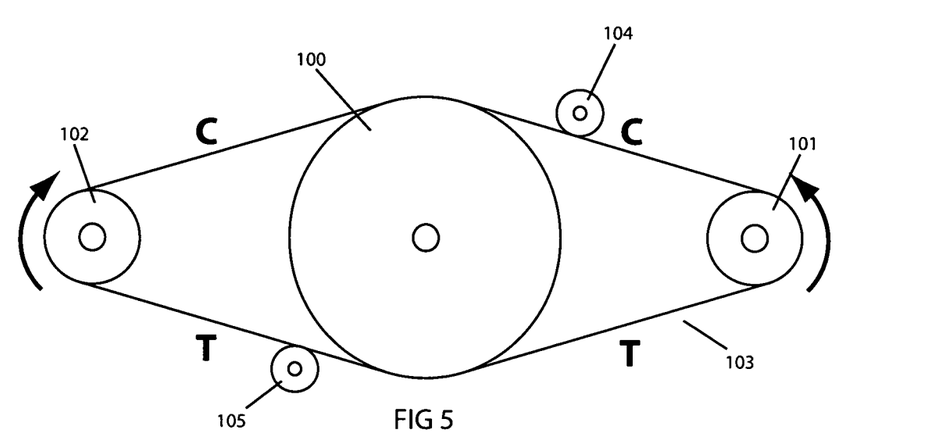
FIGS. 5, 6 and 7 illustrate the equalization sequence for the embodiment illustrated in FIG. 3.
Figure 6:
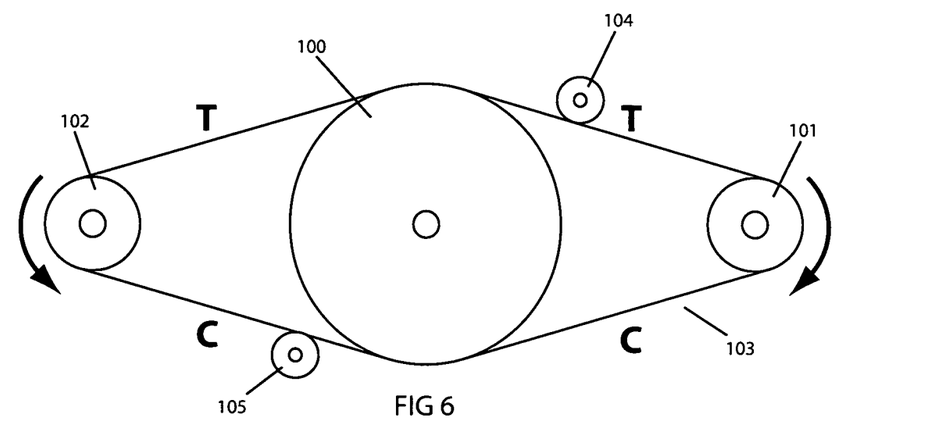
Figure 7:
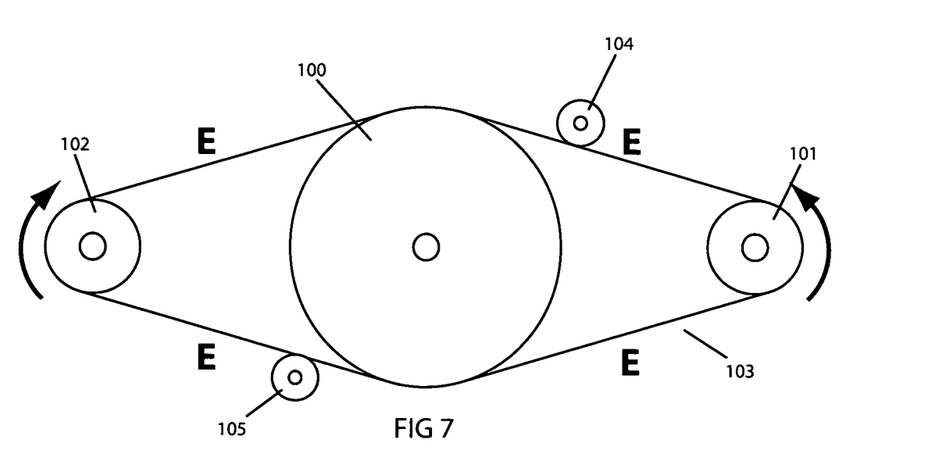

FIGS. 5, 6 and 7 are diagrammatic views of an embodiment of the present invention showing an example of this equalization sequence. In this sequence the motors work as an antagonistic pair at the end of a move to equalize tension and center up the hysteresis in an automatic centering operation. The sequence is as follows:

Stage 1: The motor control system detects that the motors have completed a motion or come to a complete halt. It then waits a further time to allow settling and to ensure that a new movement command is not underway. This wait time should be long enough such that, in normal operation, a new move is not immediately expected and may typically be around 0.5 sec.

Stage 2: As illustrated in FIG. 5 the two motors and associated driving pinions 101 and 102 are slowly driven in opposing directions. As illustrated pinion 102 is driven clockwise and pinion 101 is driven counter-clockwise. This motion creates areas on the belt 103 of higher tension (T) and higher compression (C) as before but this time these areas are symmetrical about the driven pinion 100. The amount of rotation of pinions 101 and 102 is chosen to be sufficient to take up any dead band or hysteresis in the system. Two bounds determine the amount of rotation to be used. The lower bound for rotation amount should be that rotation needed to take up the hysteresis or slack in a worst case example of the manufactured system exhibiting maximum hysteresis and slack. The upper bound for rotation amount should be that rotation which, in the case of a stepper motor, might cause the stepper motor to misstep by a full step. These values may be empirically determined during the development of the product and may then be hard coded into the firmware. For example, in a typical system using a 7.5 degrees/step stepper motor a value of 1.5 steps or approximately 10 degrees may be appropriate. An embodiment using servo motors does not have the restriction of keeping the movement below a full step. However, in this case the upper bound could then be established by the torque of the motors and the requirement that no part of the drive mechanism shall slip. For example a toothed belt system should not be driven to the point where a tooth on the belt slips one cog on the driving pinion. The speed of the rotation is not critical but should be slow enough that no vibration or jerks are transmitted through the system and a repeatable steady state condition is achieved. In a typical embodiment a time of three seconds may be appropriate for the entire sequence.

Stage 3: As illustrated in FIG. 6 the two motors and associated driving pinions 101 and 102 are now reversed and slowly driven back in opposing directions. As illustrated pinion 102 is driven counter-clockwise and pinion 101 is driven clockwise. As in Stage 2 this motion creates areas on the belt 103 of higher tension (T) and higher compression (C) symmetrically about the driven pinion 100. The amount of rotation of pinions 101 and 102 is greater than that used in Stage 2 so as to rotate the driving pinions 101 and 102 past the original starting point in the opposite direction. Typically this rotation is twice that used in Stage 2 and thus may be around 20°.

Stage 4: As illustrated in FIG. 7 the two motors and associated driving pinions 101 and 102 are reversed again and slowly driven in the direction they were driven in Stage 2. As illustrated pinion 102 is driven clockwise and pinion 101 is driven counter-clockwise. The motors and associated driven pinions 101 and 102 are moved back to the original starting, target position they were at in Stage 1. Thus the final position of pinions 101 and 102 is unaffected by this sequence however the tension and hysteresis in the belt 103 and the entire drive system is equalized and centered to a known state. The sequence further takes any directional tension out of the dampening system.

The system is thus left in a known predictable state such that subsequent moves will always start from the known, identical, starting condition no matter which direction, speed or torque the previous move left that condition in. As we are now starting from a known state it is possible to apply a known and fixed compensation for the system hysteresis to ensure an accurate and repeatable positioning of the driven pinion 100.

If a new position change command is received during any stage of the equalization sequence the system will immediately halt the equalization sequence and obey the new movement command. At the end of the new movement command the system will continue and finish the equalization sequence from the point at which it was interrupted. It will then perform another complete initialization sequence.

The accurate positioning of the motors driving the driven pinions 101 and 102 is achieved by means well known in the art such as stepper motors or servo systems; however the present invention is inherently driven open loop and thus has no requirement for closed loop operation utilizing high accuracy sensors on the driven pinion 100. It thus affords a high accuracy solution at significantly lower cost and complexity than prior art solutions.

Figure 8:
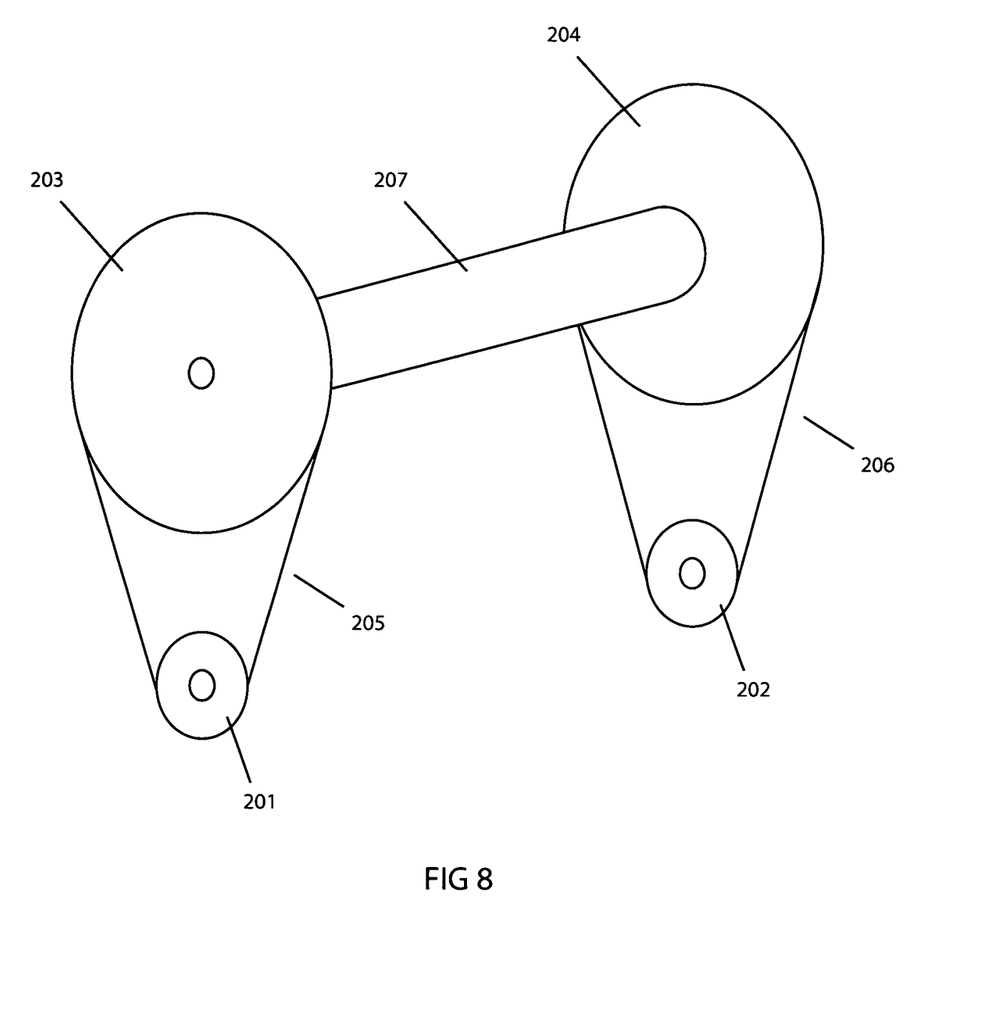
FIG. 8 illustrates another embodiment of the mechanical elements of another embodiment of the present invention as it may be applied to the tilt axis of an automated luminaire.

The embodiments illustrated in FIGS. 3 through 7 show a system using a single belt drive mechanism from two driving pinions to a single, common, driven pinion. The invention is not so limited and other embodiments are possible. FIG. 8 illustrates a further embodiment of the present invention where the two driving pinions, 201 and 202, drive separate belts 205 and 206 and separate driven pinions 203 and 204. The two driven pinions 203 and 204 are coupled through the head of the luminaire, here illustrated diagrammatically by member 207, and thus can be considered as being rigidly connected and part of a single system. In operation the equalization stages for such a system are identical to those outlined above with the two driving pinions 201 being controlled in an antagonistic manner to equalize the system hysteresis and tension.

Figure 9:
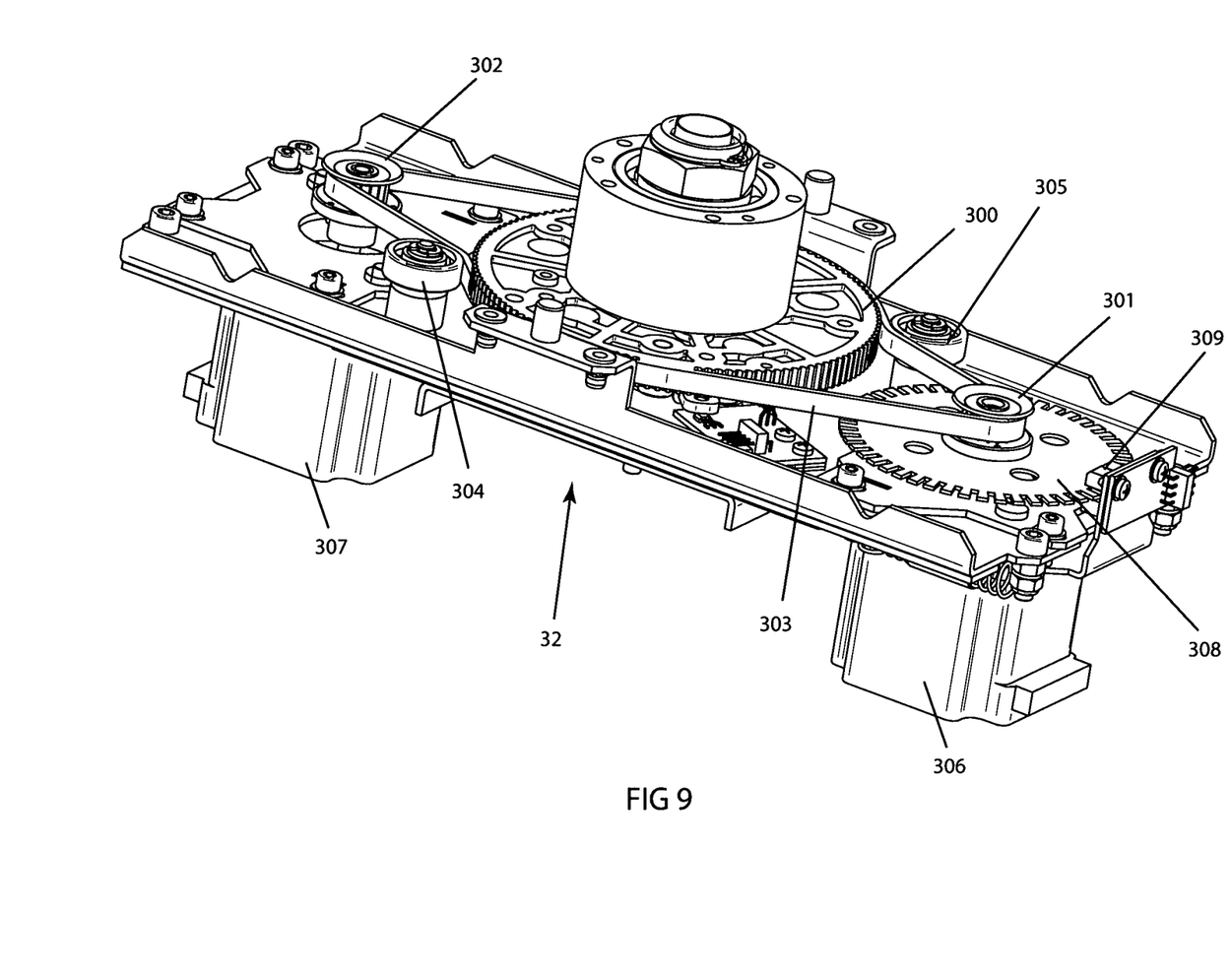
FIG. 9 illustrates an exemplary embodiment of the mechanical components of one embodiment of the present invention as applied to the pan axis of an automated luminaire.

FIG. 9 is an illustration of an exemplary embodiment of the present invention showing the system as applied to the pan axis of an automated luminaire. All the elements described above in the diagrammatic representation of the system are present in the exemplary embodiment. Stepper motors 306 and 307 rotate driving pinions 301 and 302 respectively. A single belt 303 couples the two driving pinions 301 and 302 with the driven pinion 300. Idler pinions 304 and 305 are provided to guide the belt 303 and to adjust the tightness of the belt 303. Idler pinions 304 and 305 are fixed idlers.

Also shown in FIG. 9 are an optical encoder wheel 308 and its associated sensor 309. These together form a coarse error sensor whose function is to detect major errors in positioning such as when the luminaire is obstructed in its motion. The encoder wheel 308 is of too coarse a resolution to be capable of the fine positioning needed and has no function in the anti-hysteresis and equalization system described herein. The system may be driven completely open loop and still take advantage of the present invention.

Figure 10:
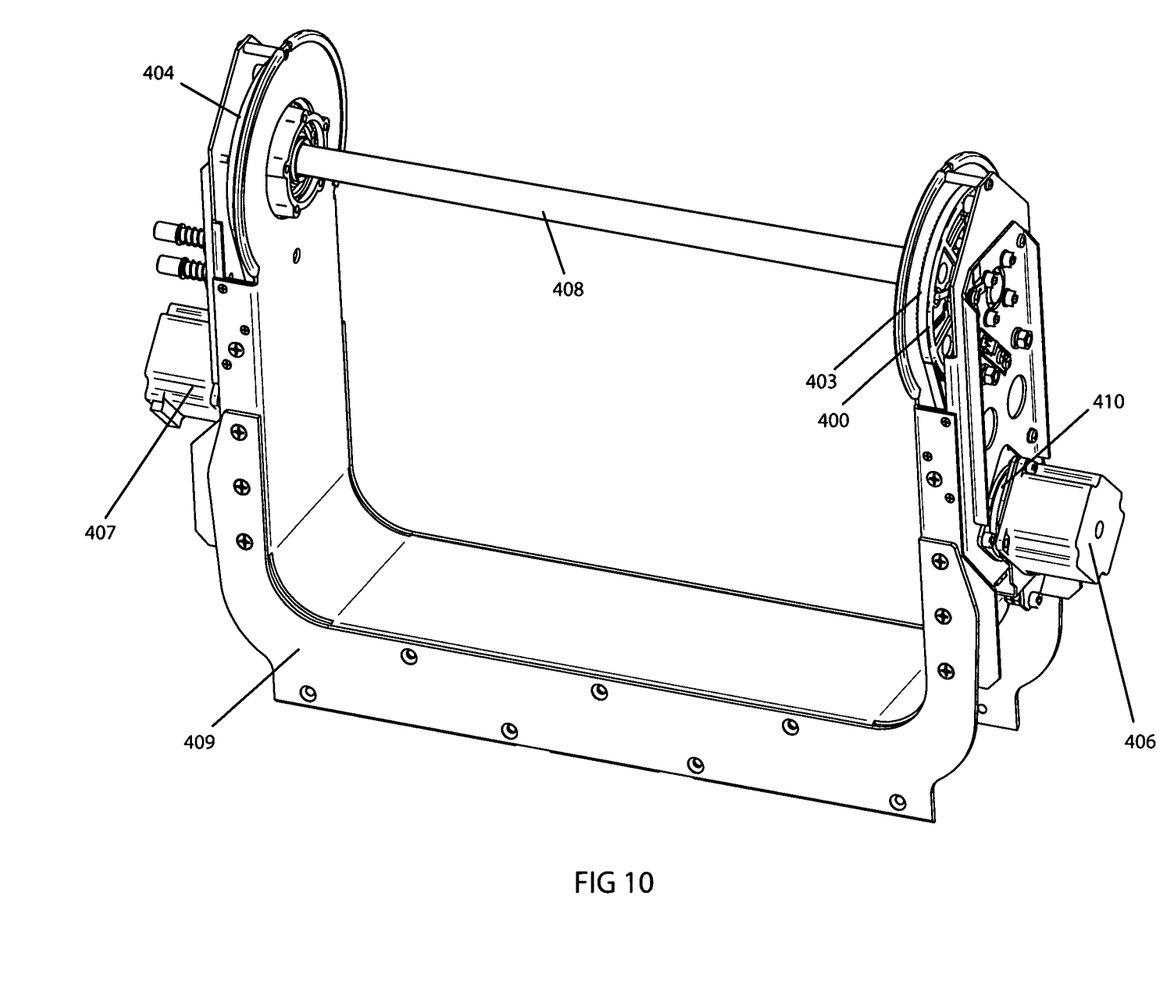
FIG. 10 illustrates an exemplary embodiment of the mechanical components of one embodiment of the present invention showing the system as applied to the tilt axis of an automated luminaire.

FIG. 10 is an illustration of a further exemplary embodiment of the present invention showing the system as applied to the tilt axis of an automated luminaire and is a realization of the diagrammatic system shown in FIG. 8. Stepper motors 406 and 407 rotate driving pinions (not shown) which in turn rotate the driven pinions (one shown 400) through belts 403 and 404. The driven pinions are coupled through the body of the luminaire, here illustrated diagrammatically by member 408, and thus can be considered as being rigidly connected and part of a single system. The frame 409 supports the system and may couple it to the pan system shown in FIG. 9. In the embodiment shown the motors 406 and 407 are mounted to the frame 409 through resilient dampeners 410. Resilient dampeners 410 reduce the transmission of noise and vibration from the motors 406 and 407 to the frame 409 and, as a consequence of their resilience, are a source of the hysteresis which this invention seeks to minimize.

Figure 11:
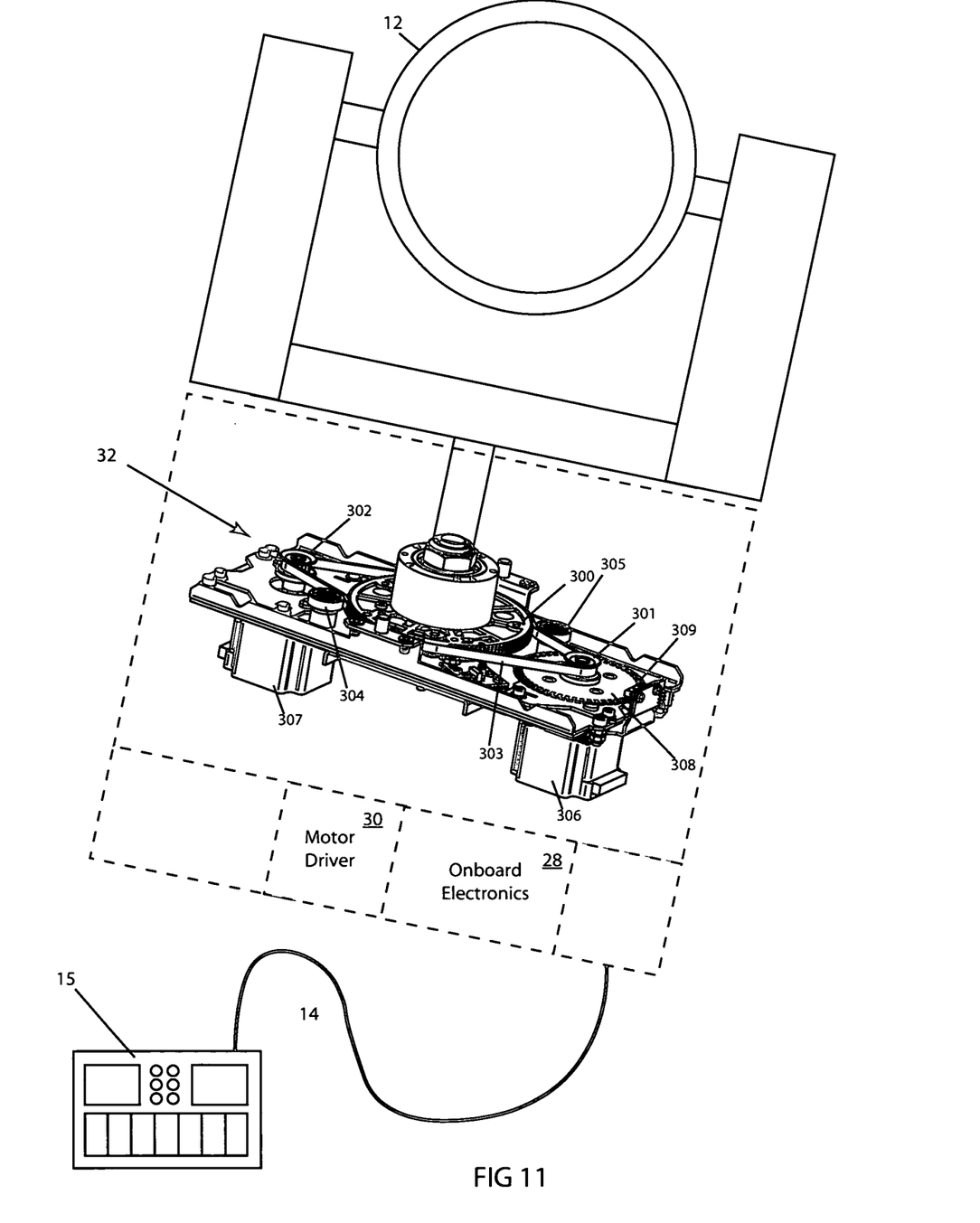
FIG. 11 illustrates an embodiment of the present invention applied to the pan axis of an automated luminaire.

FIG. 11 illustrates an embodiment of the present invention applied to the pan axis of an automated luminaire and illustrates how the conceptual blocks of FIG. 2 align with the exemplary mechanism described in FIG. 9. The control desk hardware and software 15 send a control signal to the luminaire via the data link 14. The control signal is received and recognized by the luminaire's on-board electronics 28. The onboard electronics include a motor driver 30 for the pan motors 306 and 307. The motor driver 30 converts a control signal into electrical signals which drive the movement of the pan motors 306 and 307. The pan motors 306 and 307 are part of the pan mechanical drive 32. When the motor moves it drives the mechanical drive 32 to drive the mechanical components which cause the light beam emanating from the luminaire 12 to pan across the stage.

Figure 12:
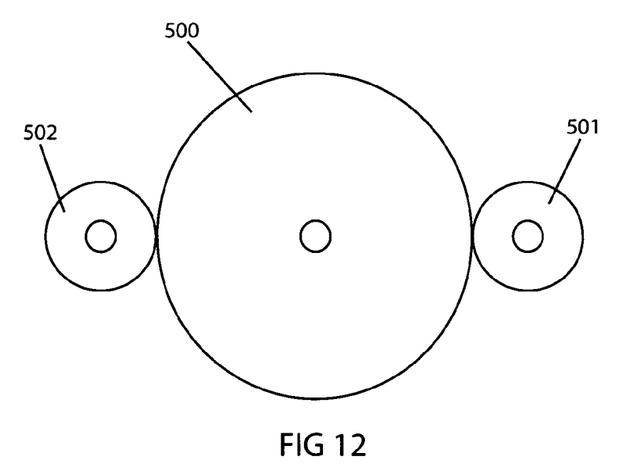
FIG. 12 illustrates a gear drive embodiment of the present invention.

FIG. 12 illustrates a gear drive embodiment of the present invention. Driving pinions 501 and 502 are geared pinions which mesh with and provide a direct drive to the geared driven pinion 500. Driving pinions 501 and 502 are rotated by their own respective motors (not shown). In the system illustrated driving pinions 501 and 502 are smaller than driven pinion 100 thus providing a gear reduction. Such a reduction may be advantageous for reasons of torque and speed of movement however it is not a requirement for the present invention. Geared pinions 500, 501 and 502 may be gears of a type selected from a list including but not limited to spur gears, bevel gears, crown gears, worm gears, helical gears or hypoid gears. In a yet further embodiment pinions 501 and 502 could be rotating pinions engaging with a linear rack gear.

Figure 13:
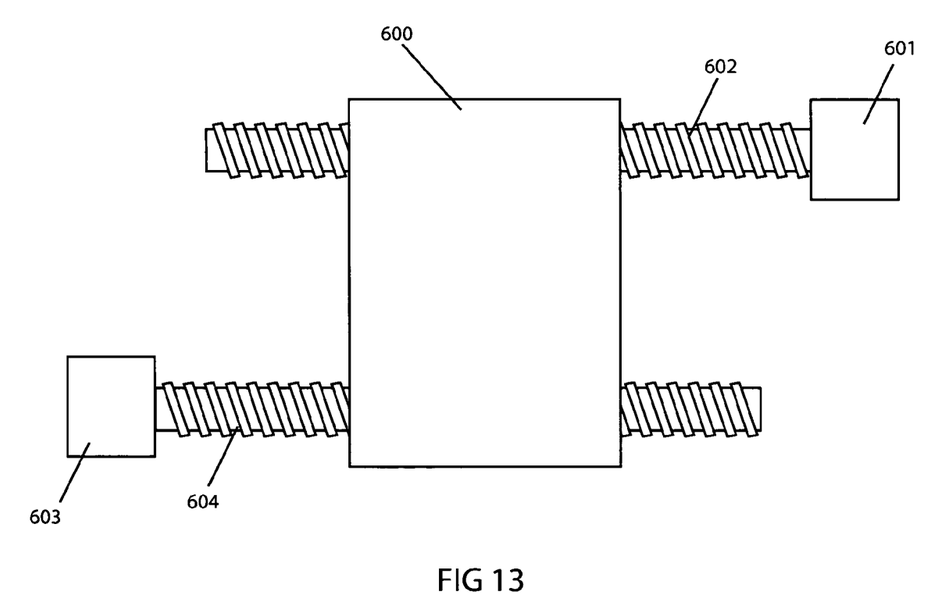
FIG. 13 illustrates a screw drive embodiment of the present invention.

FIG. 13 illustrates a lead screw/worm drive embodiment of the present invention. Motors 601 and 603 rotate lead screws 602 and 604 respectively. Lead screws 602 and 604 engage in threads within block 600. Block 600 may be translated through the rotation of motors 601 and 603 and their respective lead screws 602 and 604. Such a mechanism provides a linear translation of block 600 which suffers from hysteresis due to back lash in the same manner as herein described. Antagonistic motion of the two motors 601 and 603 through a cycle identical in concept to that described in FIGS. 5, 6 and 7 will equalize the system hysteresis and tension.

While the invention has been described with respect to a limited number of embodiments, those skilled in the art, having benefit of this invention, will appreciate that other embodiments may be devised which do not depart from the scope of the invention as disclosed herein. Accordingly, the scope of the invention should be limited only by the attached claims.

The invention has been described in detail, it should be understood that various changes, substitutions and alterations can be made hereto without departing from the spirit and scope of the invention as described by the appended claims.

What is claimed is:

1. An automated luminaire comprising:
a drive system for driving movement of a modulator of a luminaire parameter;
a plurality of motors which drive movement of the drive system in a plurality of directions;
a motor controller drives the motors in a cooperative direction to move the modulator and includes an automatic hysteresis control routine which normalizes for hysteresis of the drive system after a movement of the modulator is complete by driving the motors in opposing directions.

2. The automatic luminaire of claim 1 wherein:
the control routine pauses after the movement is complete before driving the motors in opposing directions.

3. The automatic luminaire of claim 2 wherein:
after driving the motors in opposing directions, the hysteresis control routine reverses the drive direction of each motor.

4. The automatic luminaire of claim 1 wherein:
after driving the motors in opposing directions, the hysteresis control routine reverses the drives direction of each motor motor.

5. The automatic luminaire of claim 1 wherein:
the parameter controlled is pan of the light beam.

6. The automatic luminaire of claim 1 wherein:
the parameter controlled is tilt of the light beam.

7. The automatic luminaire of claim 1 wherein:
the drive system includes belts.

8. The automatic luminaire of claim 1 wherein:
the drive system includes drive screws.

9. The automatic luminaire of claim 8 wherein:
the gears are friction gears.

10. The automatic luminaire of claim 1 wherein:
the drive system includes gears.

11. An automated luminaire comprising:
a drive system for driving changes in modulation of a luminaire parameter;
a plurality of motors which drive movement of the drive system;
a motor controller which drives the motors cooperatively to drive changes in the modulation of the luminaire and includes an automatic hysteresis control routine for normalizing hysteresis which is initiated after a modulation changing movement of the drive system is complete where the hysteresis control routine drives the motors in opposing directions.

12. The automatic luminaire of claim 9 wherein:
the hysteresis normalization control routine is interrupted when the motor controller receives instructions to drive a change in the modulation of the luminaire parameter .

13. The automatic luminaire of claim 12 wherein:
after driving the modulation of said luminaire parameter, the hysteresis normalization control routine proceeds from where it was interrupted to complete the routine.

14. The automatic luminaire of claim 12 wherein:
after driving the modulation of said luminaire parameter, the hysteresis normalization control routine reinitiates.

\* \* \* \* \*